United States Patent [19]

Tatina

[11] Patent Number: 4,776,736
[45] Date of Patent: Oct. 11, 1988

[54] TWIN CONTAINER HOLD DOWN

[75] Inventor: Richard A. Tatina, Countryside, Ill.

[73] Assignee: Portec, Inc., Oak Brook, Ill.

[21] Appl. No.: 56,246

[22] Filed: Jun. 1, 1987

[51] Int. Cl.[4] .......................... B60P 7/13; B61D 45/00
[52] U.S. Cl. ........................................ 410/83; 410/78; 410/69; 410/91
[58] Field of Search ........................ 410/44, 52, 54, 69, 410/77, 78, 80–83, 90, 91; 24/287

[56] References Cited

U.S. PATENT DOCUMENTS

| | | | |
|---|---|---|---|
| 3,111,341 | 11/1963 | Fujioka et al. | 410/82 |
| 3,159,111 | 12/1964 | Gutridge et al. | 410/79 |
| 3,193,238 | 7/1965 | Sherrie | 410/82 |
| 3,251,314 | 5/1966 | Gutridge | 410/81 X |
| 3,331,333 | 7/1967 | Coulson | 410/81 |
| 3,521,845 | 7/1970 | Sweda et al. | 410/83 |
| 3,618,999 | 11/1971 | Hlinsky et al. | 410/3 |
| 3,682,423 | 8/1972 | Scarborough | 410/83 |
| 3,682,432 | 8/1972 | Lapaich | 410/83 |
| 3,724,796 | 4/1973 | Hawkins et al. | 410/83 |
| 3,768,857 | 10/1973 | Horton | 410/83 |
| 3,894,493 | 7/1975 | Strecker | 24/287 |
| 3,894,494 | 7/1975 | Erith et al. | 410/83 |
| 3,924,544 | 12/1975 | Grau et al. | 410/78 |
| 4,092,040 | 5/1978 | Tatina | 410/83 |
| 4,108,081 | 8/1978 | Blanz | 410/82 |
| 4,630,981 | 12/1986 | Mandrell | 410/91 |

FOREIGN PATENT DOCUMENTS

| | | | |
|---|---|---|---|
| 1949697 | 4/1971 | Fed. Rep. of Germany | 410/80 |
| 1200243 | 7/1970 | United Kingdom | 410/83 |

*Primary Examiner*—Robert B. Reeves
*Assistant Examiner*—Scott H. Werny
*Attorney, Agent, or Firm*—Hill, Van Santen, Steadman & Simpson

[57] ABSTRACT

A hold down device is provided to engage and hold down adjacent ends of containers on a flat bed vehicle. The hold down device includes four twist locks being two longitudinally spaced pairs of twist locks, each pair being two laterally spaced twist locks which hold down each end of a container. The twist locks are spring loaded so that they will be continuously biased into a protruding operative position, yet capable of being automatically recessed when a long container is set down over the hold down device. A connecting apparatus is provided to inter-connect all four twist locks for simultaneous movement between a locked and unlocked position and an over-center spring is provided to hold the twist locks in the currently selected position.

3 Claims, 3 Drawing Sheets

TWIN CONTAINER HOLD DOWN

BACKGROUND OF THE INVENTION

1. Field of the Invention

The present invention relates to hold downs for cargo containers and more particularly for a hold down device capable of simultaneously holding down two adjacent containers.

2. Description of the Prior Art

Hold down devices for locking containers on a flat bed vehicles such as a trailer, truck or railway flat car are well known in the art and include devices which are vertically retractable to provide a clearance at the top side of the flat bed in the event that differing sized containers are to be held down such as is illustrated in U.S. Pat. Nos. 3,724,796; 3,894,494; 4,630,981. Also, hold down devices which include a multiple operation from one point are known such as those disclosed in U.S. Pat. Nos. 3,159,111; 3,894,493. Further, hold down devices are known in which the hold down device is hydraulically raised and/or locked or unlocked such as disclosed in U.S. Pat. No. 3,924,544.

SUMMARY OF THE INVENTION

The present invention provides a hold down device which is used to secure two short freight containers on a flat bed vehicle such as a trailer, truck or railway flat car. The device is to be located midway between the end restraining devices used to secure the four corners of a long freight container. When a long container is loaded, the hold down device of the present invention is automatically displaced downwardly when contacted by the underside of the long container. The hold down device is spring loaded to automatically return to the extended position when the long container is off loaded. When one or two short containers are loaded, the hold down devices engage a bottom aperture of the lower container corner fittings. After the container or containers are loaded a handle is inserted into an operating receptacle of the hold down device and is rotated 90°. Rotating the handle 90° causes the twist locks, forming a portion of the hold down device, to rotate 90° to secure the engaged end of the container. By connecting the operating mechanism from the unit on one side of the flat bed vehicle to a similar unit on the other side, all four locks can be actuated simultaneously by one operator from one side of the flat bed vehicle.

The hold down device includes an over-center extension spring and crank shaft operating rod which keep the locks from moving when the containers are in transit.

DESCRIPTION OF THE PREFERRED EMBODIMENTS

Figure 1:
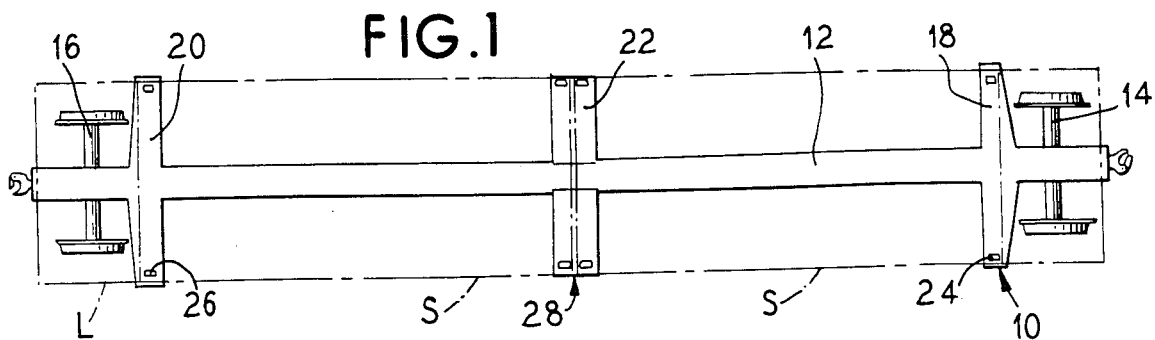
FIG. 1 is a plan view of a flat bed vehicle in the form of a railway flat car provided with a hold down device embodying the principles of the present invention.
Figure 2:
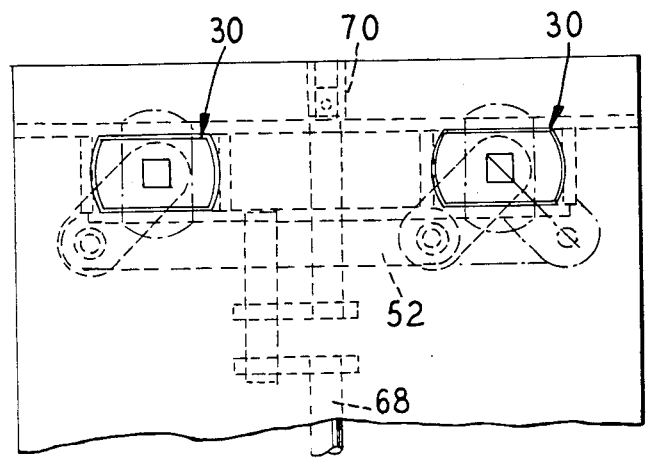
FIG. 2 is an enlarged, partial plan view of the hold down device illustrated in FIG. 1.
Figure 3:
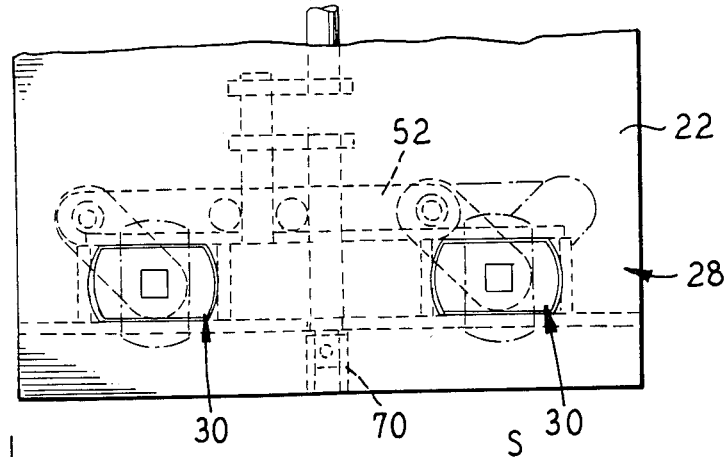
FIG. 3 is a side elevational view of the flat bed vehicle of FIG. 1.
Figure 3:
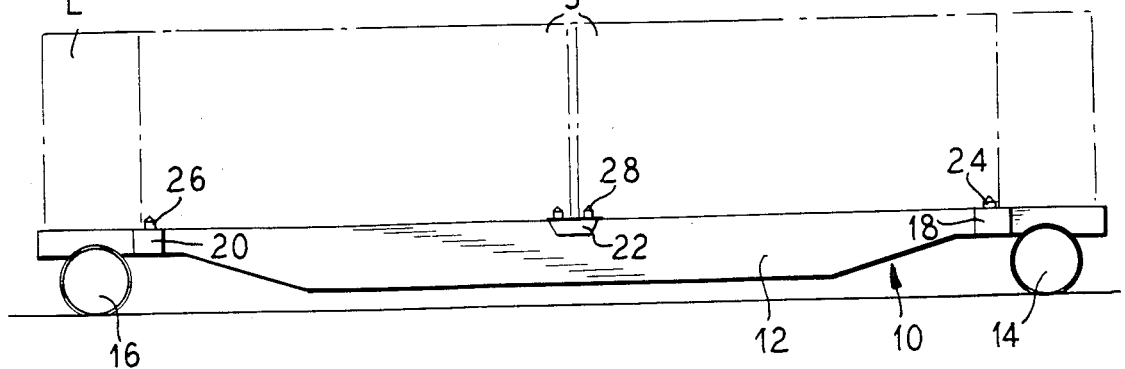

FIG. 1 is a plan view and FIG. 3 is a side elevational view of a flat bed vehicle 10 such as a rail car which has a longitudinal support member 12 extending the length of the vehicle which is supported on a pair of wheels 14, 16 at either end of the rail car. The vehicle includes lateral support arms 18, 20 close to the longitudinal ends of the rail car and adjacent to the wheel pairs and an additional lateral support arm 22 positioned at the longitudinal midpoint of the rail car. The lateral support arms 18, 20, 22 each project in both lateral directions from the central longitudinal support member 12 and the ends of the lateral arms define a rectangular shape corresponding to the shape of a single long cargo container L (shown in phantom in FIGS. 1 and 3) which would extend from one end of the rail car to the other, or two smaller cargo containers S (shown in phantom in FIGS. 1 and 3), each of which would extend from near an end of the rail car to a center point, being the center of the lateral arm 22.

Each of the lateral arms 18, 20, 22 are provided with hold down devices or arrangements 24, 26 and 28, respectively, which engage with the cargo containers to securely lock the cargo containers onto the container vehicle. The hold down device 28 provided on the central lateral arm 22 is shown in greater detail in FIGS. 2-8 and it is this hold down device which embodies the principle of the present invention.

As seen in FIGS. 2 and 4-8, the central hold down device 28 comprises a pair of longitudinally spaced locking members 30 such as twist locks adjacent to each lateral end of the lateral arm 22 such that a total of four twist locks 30 are provided in the central lateral arm 22. Each of the twist locks 30 has a locking head 32 which is tapered inwardly and upwardly at its sides and ends in a manner conventional with such locks and is of substantially the width and length of an upper end portion of a lock housing 34 which is vertically slidably guided in a framework 36 secured below a top surface 38 of the lateral arm 22.

Figure 4:
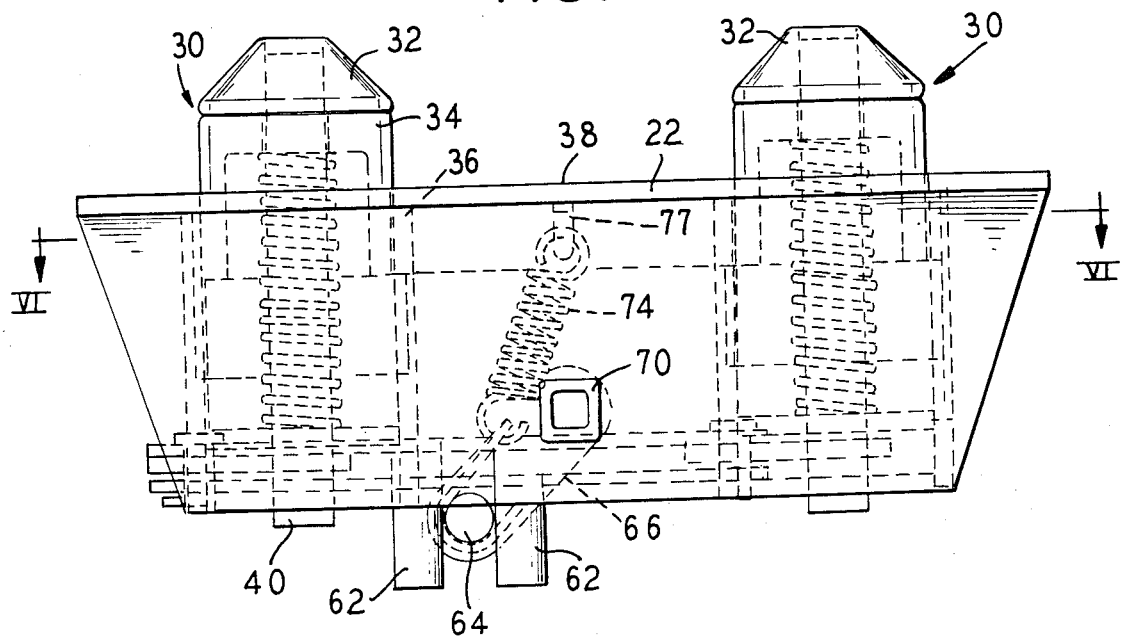
FIG. 4 is a side elevational view of the hold down device of FIG. 2.
Figure 5:
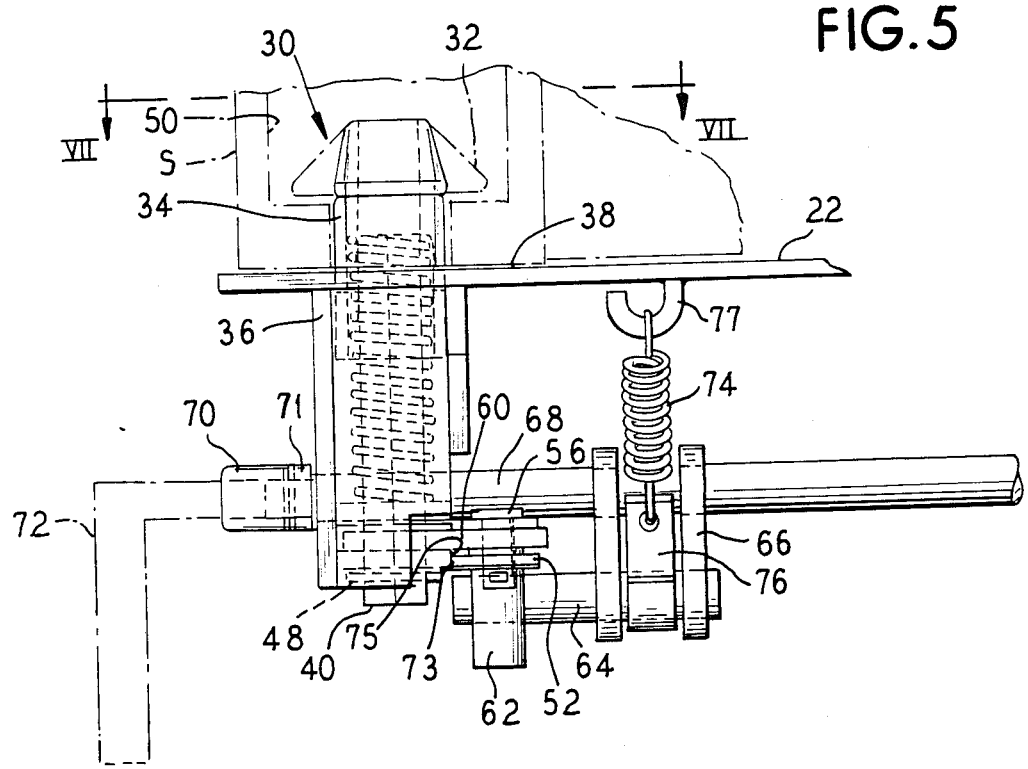
FIG. 5 is an end view of the hold down device of FIG. 4
Figure 6:
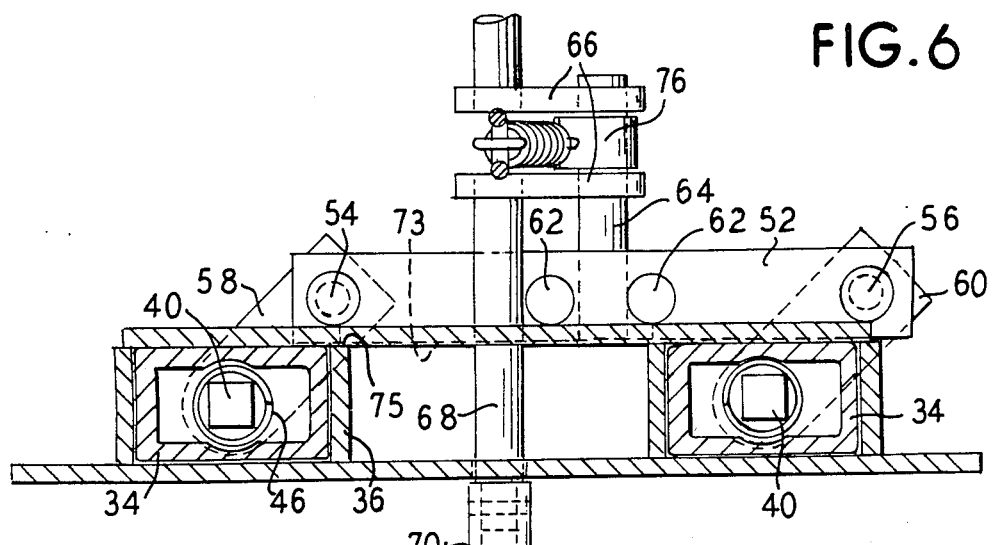
FIG. 6 is a sectional view of the hold down device taken generally along the line VI—VI of FIG. 4.
Figure 7:
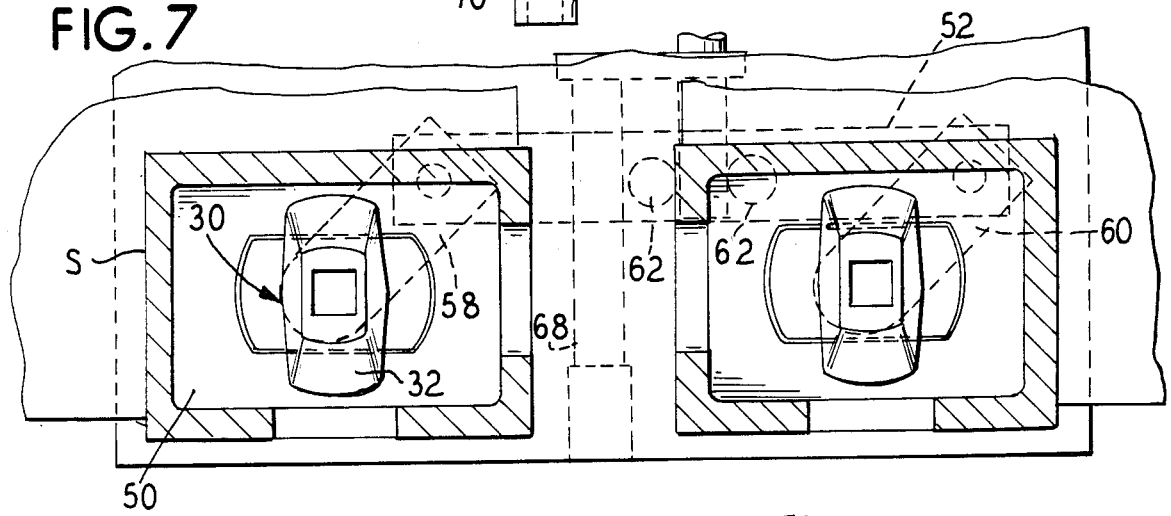
FIG. 7 is a section view of the hold down device taken generally along the line VII—VII of FIG. 5.

Each locking head 32 is mounted on a post 40 which depends therefrom, the post having a square cross section and being carried in the sliding frame 36 such that it is able to rotate 90° about its longitudinal axis to permit the locking head 32 to be moved between a locked position as indicated by dashed lines in FIG. 5 and a release and unlocked position as indicated by full lines in FIG. 5. The post 40 extends downwardly throug an opening 42 in a floor 44 of the framework 36 and is continuously biased into an upward position by means of a coil spring 46 which abuts at a bottom end against the floor 44 of the framework 36 and abuts at a top end against a top wall 47 of the lock housing 34. A cross pin 48 is secured near a bottom end of the post 40 to provide an upward movement limit for the post. In an uppermost position, the locking head 32 and part of the lock housing 34 protrude above the top surface 38 of the lateral arm 22 as shown in FIGS. 4 and 5. This permits the locking head to extend into a cavity 50 formed in a bottom of the container S and to be rotated therein to the locked position to perform the hold down function (see FIG. 7).

Figure 8:
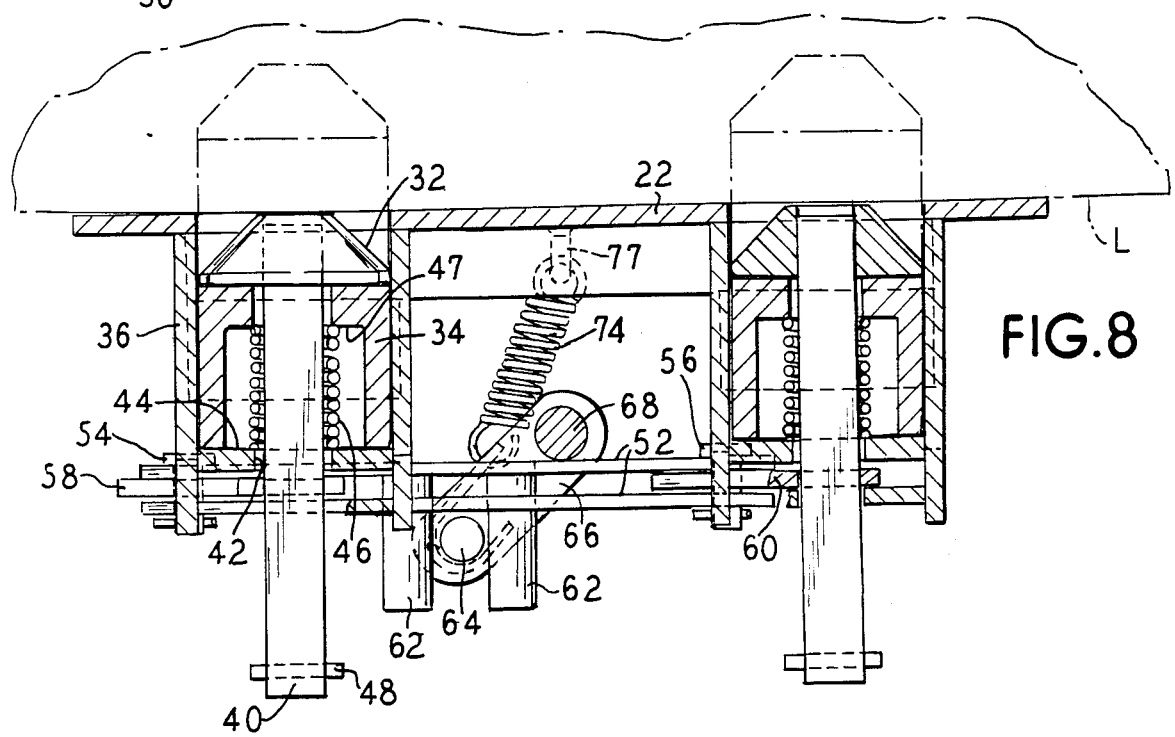
FIG. 8 is a side sectional view of the hold down device of FIG. 4 pressed into a recessed position.

The twist lock 30, because of its spring loaded mounting is also capable of being depressed downwardly, as illustrated in FIG. 8, when a long container L having the full length of the container vehicle is set onto the vehicle and wherein there are no cavity openings present for engagement by the central twist locks. Thus, the weight of the container overcomes the bias of the spring 46 and urges the locking head 32, lock housing 34 and post 40 downwardly into the recessed position shown. No separate operation is required to move the twist lock out of the way when such a container is to be transported. When the container is removed, the twist locks will automatically be raised to their accessible positions where they will be capable of their locking function.

The two longitudinally adjacent twist locks on each lateral end of the lateral arm 22 are tied together for rotation purposes by means of a spaced pair of cross links 52 which are pivotally connected by pins 54, 56 to shift levers 58, 60 which in turn are attached to the square posts 40. The shift levers 58, 60 are sandwiched between the spaced cross links 52. The cross links 52 have a pair of spaced, downwardly depending studs 62 between which is positioned a horizontal lug 64. The lug 64 is carried at the end of a pivotable crank arm 66, the other end of which is secured to a shaft 68 about the axis of which the crank arm 66 rotates. A socket 70 is provided at an exposed end 71 of the shaft 68 to accept a crank handle 72 for rotating the shaft 68. When the shaft 68 is rotated, the crank arm 66 is caused to pivot, thus moving the lug 64 longitudinally relative to the vehicle through a vertical arc. Since the lug 64 is slidingly captured between the downwardly extending studs 62, the cross links are caused to also move longitudinally, but through a horizontal arc thereby pivoting the shift levers 58, 60 and causing the square posts 40 to rotate 90°. A long face 73 of the cross links 52 abuts against a face 75 of the framework 36 at either end of its longitudinal travel arc to result in the 90° rotation.

The crank arm 66 is continuously biased into either a forward or rearward position by an over-center spring 74 which is attached at one end to a clip 76 rotatably attached to the lug 64 and at an opposite end to a hook 77 secured to an underside of the lateral arm 22, the hook being positioned directly above the axis of rotation of the shaft 68. Thus, when the crank arm 66 is moved to a position to either side of the shaft 68, the spring 74 biases the crank arm into the farthest movable position from the center line, thus virtually locking it into that position and preventing it from accidentally shifting into the opposite position. In this manner, both adjacent twist locks are operated simultaneously by manual manipulation of the crank handle 72 thereby reducing the number of steps required to secure the two containers S to the flat bed vehicle.

It is also preferable to extend the shaft 68 across the length of the lateral arm 22 so that it is connected to an identical cross link and shift lever assembly at the opposite lateral side (FIG. 2) which would thereby allow for the simultaneous actuation of the four twist locks provided on the central lateral arm 22. The shaft 68 could be operated from either end, in that both ends would be provided with a handle socket 70 thus avoiding the requirement for a user to walk around to both sides of the vehicle in order to actuate the twist locks located on both sides.

Therefore, it is seen that a twin container lock is provided to secure adjacent ends of short freight containers on a container carrying vehicle which are automatically displaced when a long container is placed on to the vehicle and also which have an operating mechanism which permits all four twist locks to be actuated simultaneously by one operator from one side of the vehicle. Means are also provided for automatically locking the twist locks into either the locked or unlocked positions as a consequence of moving the twist locks to those positions.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. In a flat bed vehicle supported by at least two longitudinally spaced pairs of wheels and used to transport at least one long cargo container and alternatively a plurality of short cargo containers arranged longitudinally on a top surface of said vehicle, a container hold down arrangement for holding down adjacent ends of two containers comprising:

at least four twist locks being at least two longitudinally spaced pairs of twist locks, each pair being two laterally spaced twist locks to engage with lateral receptacles in an end of one of said containers;

said twist locks being movable between a protruding position and a recessed position relative to said top surface and each being rotatable about a vertical axis between a locked position and an unlocked position;

a framework below said top surface in which each twist lock is vertically slidably mounted and spring means carried in said framework engaged with said twist locks to bias said twist locks upwardly into the protruding position; the biasing force of said spring means being less than the weight of said large container;

a plurality of shift levers, each of said levers being connected to a different twist lock;

a cross link member at each lateral side of said vehicle pivotally connected to said plurality of shift levers; and a manually rotatable crank shaft connected to cross link members at both lateral sides of said vehicle to cause a longitudinal movement of said cross link members to effectuate pivoting of said shift levers thereby resulting in simultaneous rotation of all of said twist locks;

an over-center spring connection between said crank shaft and said vehicle for retaining said twist locks in a currently selected one of said locked and unlocked positions until a sufficiently large manual force overcomes the spring retaining force and causes a rotation of said twist locks to the other of said positions;

whereby, all of said twist locks are rotatable from a single location simultaneously between said locked and unlocked positions, said twist locks are automatically recessible and extendable upon the placement or removal of a long cargo container on said flat bed vehicle, and said twist locks are automatically held in a selected locked or unlocked position.

2. A hold down device according to claim 1, wherein said twist locks have a downwardly extending square cross sectional post on which one end of said shift levers are captured such that pivoting of said shift lever will cause rotation of said twist lock.

3. A hold down device according to claim 2 including a crank arm pivotally connected at one end to said crank shaft and connected at an opposite end to said cross link member to effect the longitudinal movement of said cross link member.

* * * * *